United States Patent

Stobbe et al.

[11] Patent Number: 6,147,591
[45] Date of Patent: Nov. 14, 2000

[54] PROCESS FOR TRANSMITTING DATA BETWEEN A READ/WRITE DEVICE AND A TRANSPONDER

[75] Inventors: Anatoli Stobbe, Steinradweg 3, D-30890 Barsinghausen; Hartmut Scheffler, Bad Nenndorf, both of Germany

[73] Assignee: Anatoli Stobbe, Barsinghausen, Germany

[21] Appl. No.: 09/174,531

[22] Filed: Oct. 16, 1998

[51] Int. Cl.[7] .................................................. H04Q 5/22
[52] U.S. Cl. ................ 340/10.51; 340/10.2; 340/10.34; 340/825.34; 702/38; 702/57; 702/64; 702/106; 342/100; 342/174; 341/120
[58] Field of Search .............................. 340/10.51, 10.2, 340/10.34, 825.34, 825.2; 702/106, 38, 57, 64, 65; 342/100, 174; 331/41, 44; 341/120; 455/41

[56] References Cited

U.S. PATENT DOCUMENTS

| 4,206,421 | 6/1980 | Bernhard et al. ...................... 331/19 |
| 5,105,190 | 4/1992 | Kip et al. ............................. 340/10.34 |
| 5,124,699 | 6/1992 | Tervoert et al. ..................... 340/10.2 |
| 5,491,471 | 2/1996 | Stobbe ................................ 340/825.34 |

*Primary Examiner*—Brian Zimmerman
*Assistant Examiner*—Yves Dalencourt
*Attorney, Agent, or Firm*—Collard & Roe, P.C.

[57] ABSTRACT

The invention is a process to transmit data between a read/write device and a transponder. The data is transmitted by a change in field strength of an electromagnetic or magnetic field, and the times between sequential field strength changes are evaluated. At least at the beginning of data transmission, the systematic time deviation from the setpoint is determined that arises upon a switching threshold in the field strength changes. A correction value is derived, and the subsequently determined times are changed by the correction value. This correction allows for a greater amount of data to be transferred from the read/write device to the transponder.

8 Claims, 4 Drawing Sheets

PROCESS FOR TRANSMITTING DATA BETWEEN A READ/WRITE DEVICE AND A TRANSPONDER

BACKGROUND OF THE INVENTION

1. Field of the Invention

The present invention relates to a process to transmit data between a read/write device and a transponder. The read/write device sends data to the transponder through induction.

2. The Prior Art

Systems consisting of read/write devices and transponders are for identifying objects, persons and animals without contact. The transponder is a data memory whose information can be read out and changed remotely with the read/write device. Passive transponder systems have become particularly wide-spread where the transponder is supplied with energy from the read/write device, and the transponder does not contain an energy source.

Energy and information are transmitted inductively. To increase the effectiveness of the transponder and its read/write device, oscillating circuits are used by both devices whose coils establish the coupling. The data is transmitted from the read/write device to the transponder by changing the field strength and evaluating the time between sequential field strength changes which are identified as pulse times.

These systems are frequently used at long range. This long range can only be obtained when the read/write device has a strong field. If the transponder is placed directly in front of the read/write device, it receives too much energy, and a very high voltage can arise at its oscillating circuit. To prevent the transponder from being destroyed when the oscillating circuit voltage is too high, the amplitude of the field is limited in the transponder.

The detected pulse times depend on the coupling between the oscillating circuits of the read/write device and the transponder, the parameters of the oscillating circuits, and the transmission strength of the read/write device. A fixed compensation for the changes or distortions is not possible, either in the read/write device or the transponder.

It is important to ensure that the potential distortion does not alter the information in the transmitted data. To measure this distortion, a first set of set points are created by an initial transmission of the signal of a set duration from the read/write device to the transponder. Therefore, the target difference between the two states' pulse times must be greater than the maximum possible time deviation of the times at which the field strengths change from the setpoints when transmitting two logical states. This increases the pulse times and consequently reduces the possible data rates that otherwise would only be determined by the smallest recognizable difference between the different pulse lengths.

SUMMARY OF THE INVENTION

The invention is designed to improve a process to transmit data between a read/write device and a transponder. One effect is to increase the data rate despite the negative effects of the transmitting and receiving components. These negative effects are from the influence of the oscillating circuits coupled together in the read/write device and the transponder, the parameters of the oscillating circuits, and the limited transmission strength of the read/write device on the pulse lengths.

The system requires a certain amount of time to change the field strength or voltage at the oscillating circuits from a minimum to a maximum and visa versa. When the amplitude is limited at the transponder oscillating circuit, one can no longer determine when the maximum field strength has been reached.

When the oscillating circuits are coupled tightly, this results in a higher maximum field strength at the transponder coil. Any limitation occurs substantially before attaining the maximum field strength. The pulse edge is therefore detected too soon. Likewise, a pulse edge is registered too late when the field strength is reduced. When the coupling is loose and the maximum field strength is lower at the transponder coil, the limitation arises shortly before reaching the maximum field strength. The pulse edge is hence detected at a delay. These influences are why the times vary between the sequential field strength changes detected by the transponder, despite constant pulse times when coding and modulating the carrier emitted by the read/write device.

However, the cited parameters that lead to variable pulse times while decoding the data behave in a systematic manner. When the pulse times detected by the transponder deviate from setpoints, they are all either too long or too short by an equal amount. In addition, the cited parameters are comparatively slow in comparison to the data rates, i.e., they only change slowly and have relatively high time constants under practical operating conditions.

Given these facts, it is possible to compensate for the deviations from the pulse times setpoints detected by the transponder. Likewise, reliability is increased when the different logical states represented by pulse times of different lengths can be clearly recognized. Thus, it is possible to reduce a safe time buffer to allow for field-strength-dependent variations in the pulse times that is otherwise necessary for reliable differentiation. One can therefore use shorter pulse times and hence transmit more pulses per unit time.

At the beginning of a data transmission, it is preferable to transmit a calibration pulse from the read/write device to the transponder. The pulse is of a set duration delimited by two field strength changes. The transponder determines the interval between the switching thresholds of the field strength changes. The difference between the measured interval and the setpoint then forms the correction value or a measure for the correction value.

The compensation can occur at the beginning of data transmission by the special calibration pulse at the start of data transmission. Since the calibration pulse is transmitted under the same operating conditions as the subsequent data transmission, the determined deviation from the setpoint can be used as a highly precise measure for the compensation during the subsequent data transmission.

In addition, the systematic time deviation from the setpoint that arises when passing through switching thresholds of the field strength changes can be determined during data transmission. In this way, the correction value determined beforehand can be updated. Furthermore, it is also possible to update the compensation when the coupling between the transponder and the read/write device changes.

When binary data is transmitted and where two different logical states are represented by two different intervals between two field strength changes, time windows can be monitored for field strength changes. Therefore, the correction values can be determined depending on the respective time window in which a field strength change falls.

Only logical states need to be differentiated during evaluation which makes this solution particularly useful for digital signal processing.

The time windows should be measured according to the foreseeable field strength changes and evaluated with the prior correction values. Since the drift of the switching thresholds for the field strength changes is relatively slow, they can be compensated correspondingly slowly and in small steps. Since only the tendency of a drift needs to be known, it is sufficient to use the prior correction value as a basis for calculating an updated correction value.

These changed and updated correction values are usefully formed from the prior correction value and a fixed interval that is subtracted from or added to the prior correction value.

Only a slight amount of storage space is required for the correction values. Individually arising disturbances in the data transmission will in fact lead to incorrect correction values. However these changes are so slight that they do not lead to sudden aberrations in the correction values. In addition, false correction values are subsequently compensated when transmission is undisturbed.

In one practical embodiment, three time windows are formed whose overall length is less than or equal to the pulse length of the logical states. The limits of a middle window are formed by the permissible tolerances of the pulse times that are symmetrical with the foreseeable time of the field strength change. Two other time windows are before and after the middle time window. The prior correction value is retained when the field strength changes in the middle time window. When the field strength changes in one of the other time windows, the correction value is increased or lowered.

With this solution, the field strength change is evaluated only when it falls in one of the time windows. By having a middle time window, the correction values are not changed when there is only a slight deviation within a tolerance range. When the tolerance range is left and the field strength changes within one of the two neighboring windows, the correction value can be changed more strongly to allow fast readjustment.

In a simpler solution, only two time windows are formed whose overall width is less than or equal to the pulse length of the logical states. The limit to the two time windows is provided by the foreseeable time of a field strength change. The correction value is either increased or lowered depending on the time window in which the field strength changes.

With this solution, the correction value is changed each time. When the transmission parameters are constant, the correction values then alternate between two values. The solution is therefore easy to realize in circuitry or a program. When the measured change steps are small, individual change steps are not noticeably disturbing.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
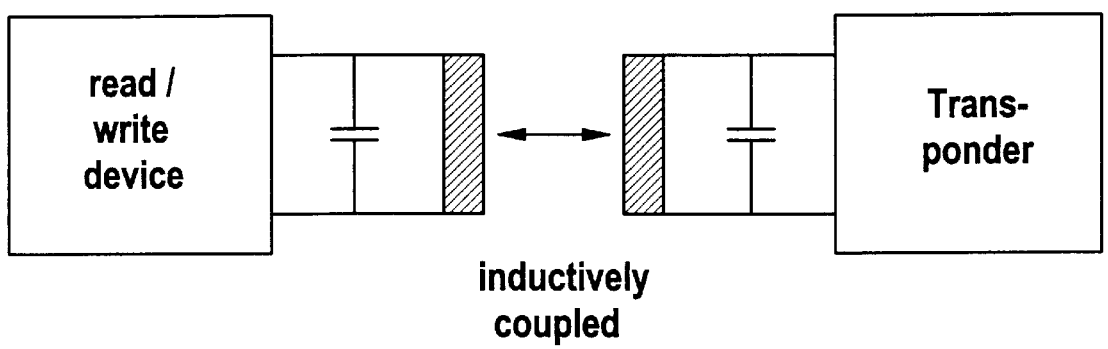
FIG. 1 is a block diagram of a read/write device and a transponder whose oscillator coils are coupled inductively.

Referring to FIG. 1, there is shown a block diagram of a read/write device and a transponder with oscillating circuits. These oscillating circuits are harmonized with the carrier frequency of the carrier emitted by the read/write device. The oscillator coils are inductively coupled. When the devices are parallel and a short distance from each other, the coupling is very tight. The coupling becomes weaker with distance or when the devices are turned in relation to each other. The transponder comprises a voltage limiter, wherein the maximum value of the field strength is no longer always identical with the maximum oscillating circuit voltage. The voltage limiter can be simultaneously used to form a switching threshold to recognize field strength changes. It is also possible to operate the voltage limiter only as a protective circuit and additionally provide a voltage comparator that determines a switching threshold to independently recognize field strength changes. This switching threshold must, however, be less than or equal to the value of the voltage limiter.

Figure 2:
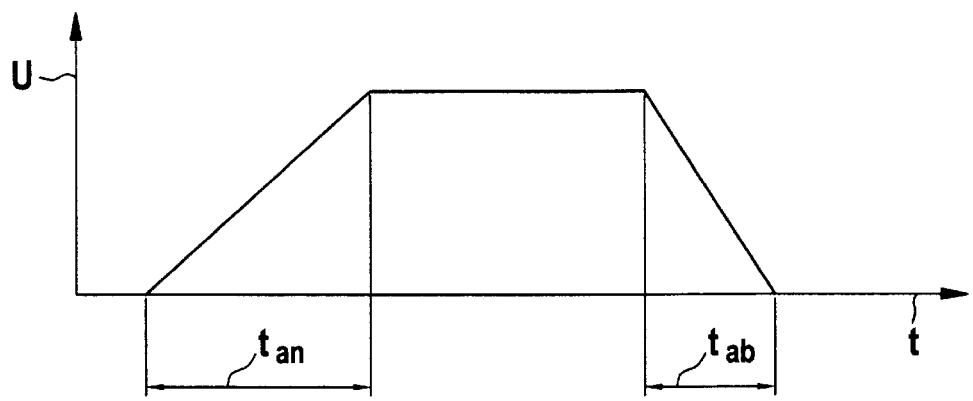
FIG. 2 is a time chart that illustrates the voltage characteristic of the oscillator coils of the transponder.

FIG. 2 shows a time chart that represents the voltage characteristic of the transponders oscillating circuit coil. Even when the transmitter in the read/write device is scanned, there are only changes between the on and off states. In this case, the read/write device's and transponder's oscillating circuit coil has a oscillating circuit voltage that only gradually rises and falls. The rise time from the minimum to the maximum is identified as $t_{an}$, and the decay time from the maximum to the minimum is identified as $t_{ab}$. The final edge slopes necessarily result from an oscillating circuits limited bandwidth circuit, and depend on its circuit quality.

Figure 3:
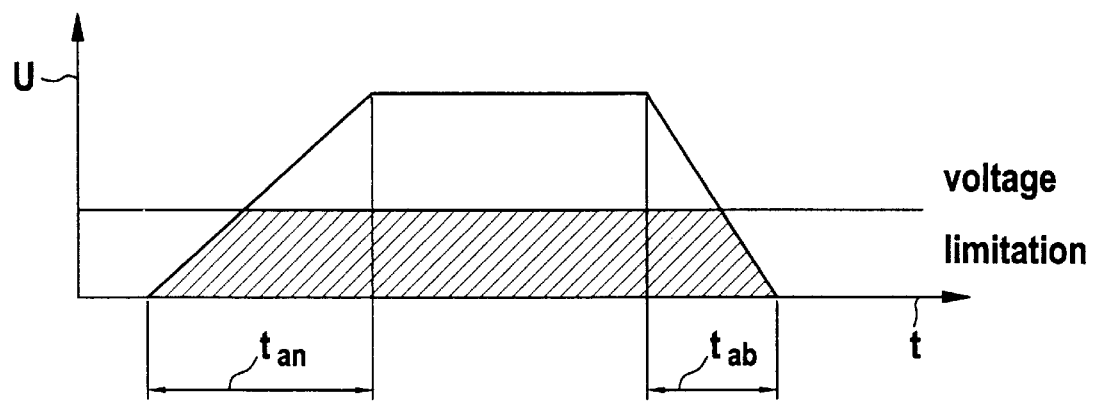
FIG. 3 is the same time chart from FIG. 2 but with voltage limiting.

FIG. 3 shows the same time chart from FIG. 2 but with voltage limiting. A voltage limiter cannot detect the time at which a pulse attains an absolute maximum. Rather it only detects the time at which the field strength change or voltage change reaches or falls below the maximum value set by the voltage limiter. This occurs when it passes through a fixed switching threshold of a voltage comparator. In addition, different edge slopes of the leading edge and the trailing edge of the pulse arise when the rise time $t_{an}$ and the decay time $t_{ab}$ are largely constant, and that the switching threshold is also constant but that the maximum of the pulse can fluctuate. This leads to different times at which the field strength changes pass through the switching thresholds.

Figure 4:
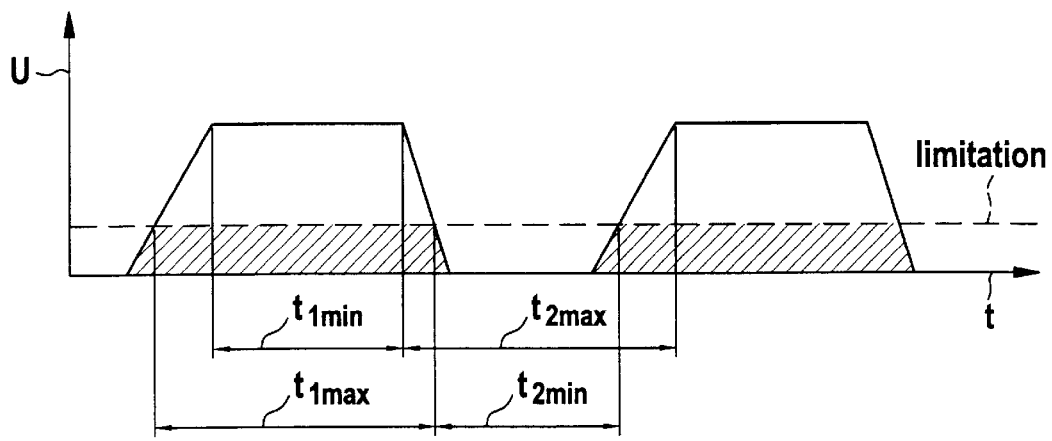
FIG. 4 is a time chart with evaluation of the pulse length.
Figure 4:
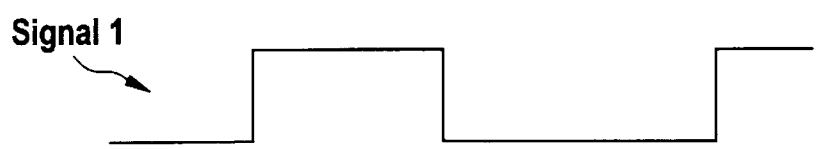
Figure 4:
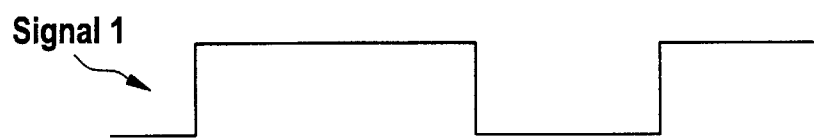

FIG. 4 shows a time diagram with an evaluation of the pulse length. There are two possible instances represented here. Signal 1 results when the transponder correctly recognizes when the transponder oscillating circuit reaches its maximum field strength or voltage. Signal 2 results when the same voltage characteristic at the transponder oscillating circuit is limited. Signal 1 can also arise when the voltage is limited when the maximum field strength or voltage coincides with the switching threshold of the voltage limitation. Signal 1 and signal 2 contain the same information, but can be interpreted differently.

The pulse times must therefore be selected to allow sufficient differentiation of different logical states so that possible distortions do not change the information of the transmitted data. When two logical states are transmitted, this means that the difference between the pulse times of the two signals must be greater than $t1_{max}-t1_{min}$, or $t2_{max}-t2_{min}$.

Figure 5:
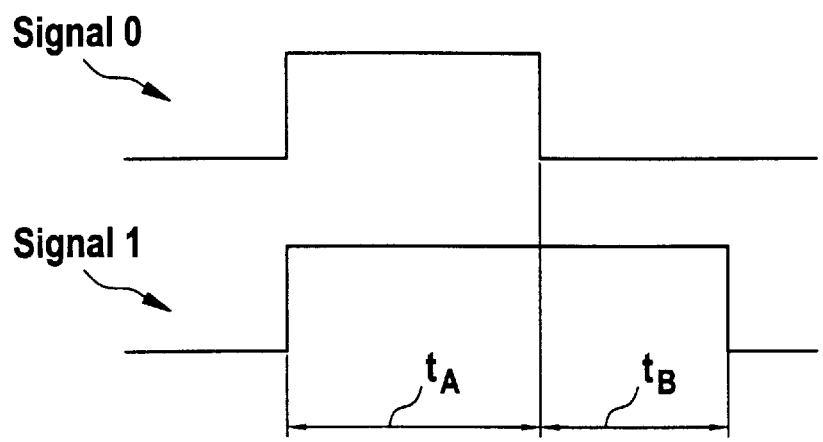
FIG. 5 is a time chart representing different logical states.

In the present invention, a pulse with a known duration is sent by the read/write device to the transponder at the beginning of data transmission. The transponder measures the pulse length and calibrates the decoder with the measured value. All following pulse times are then evaluated based on this correction value. While data is being transmitted, the coupling can fluctuate between the read/write device and the transponder, and the received pulse times can also fluctuate. The calibration therefore has to be adjusted. Since the difference between the pulse times of different logical states is constant, the distortions of the pulse times only have an effect on the absolute times and not on their differences. FIG. 5 shows two different signals, 0 and 1. The signals consist of a constant portion $t_A$, and a portion $t_B$ that serves as a differentiating feature between the two signals. Only portion $t_A$ is affected by the possible distortions. Therefore only one time must be determined for correction and compensation, and it is subtracted from all the incoming pulse times or added to the incoming pulse times to compensate for the distortions.

Specific times are expected for the different information (e.g., binary data transmission 0 and 1) after compensation. If the received pulse times no longer correspond to the expected ideal values, the compensation value must be adapted. The adaptation can be carried out by forming the difference between the received time and the ideal time or by simply increasing or lowering the compensation value by a step.

Figure 6:
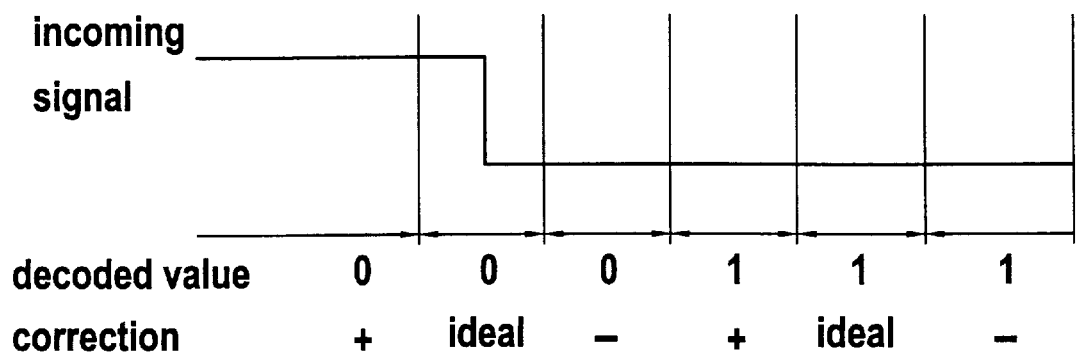
FIG. 6 is a time chart with time windows to evaluate field strength changes.

FIG. 6 shows a time diagram with time windows to evaluate field strength changes by classifying an incoming pulse and deriving a correction value. The edge of the example pulse falls at an ideal time within range 0. The pulse is decoded as 0 or 1 depending on the duration. Limits of a middle time window for ideal field strength changes are formed by permissible tolerances that are symmetrical to the foreseeable time of the field strength change. A slight change in the pulse time therefore does not lead to a misinterpretation. If the pulse time lies outside of the ideal value, the correction value is adapted. In the windows marked with +, the correction value must be changed so that the pulse times to be evaluated are longer, and the opposite is true for the windows marked with −.

In implementing this process in practice, the time range for the ideal pulse width can also be selected as 0 to reduce switching.

Accordingly, while a few embodiments of the present invention have been shown and described, it is to be understood that many changes and modifications may be made thereunto without departing from the spirit and scope of the invention as defined in the appended claims.

What is claimed is:

1. A process for transmitting data between a read/write device and a transponder, comprising the steps of:
   a) transmitting a data signal from a read/write device to a transponder via an electromagnetic field;
   b) changing the field strength of the electromagnetic field;
   c) evaluating the times between sequential field strength changes;
   d) determining a systematic time deviation from a setpoint that arises when a switching threshold of the field strength change is passed through, thereby obtaining a correction value; and
   e) detecting times that are changed by said correction value.

2. The process according to claim 1, further comprising the steps of:
   transmitting a calibration pulse of a set duration from the read/write device to the transponder to form a setpoint;
   determining the length of time between the switching thresholds of the field strength changes; and
   calculating the correction value by measuring the difference between the measured duration and the setpoint.

3. A process according to claim 1, further comprising the step of updating the previously obtained correction value.

4. A process according to claim 3, further comprising the step of:
   monitoring the changes in field strength during transmission of binary data where two different logical states are represented by two different intervals between two field strength changes and the correction values are determined depending on a respective time window in which a change in field strength occurs.

5. A process according to claim 4, further comprising the steps of:
   measuring the time windows according to the foreseeable field strength changes evaluated with the prior correction values.

6. The process according to claim 4, further comprising the steps of:
   updating correction values from a prior correction value; and
   fixing an interval that is added to or subtracted from the prior correction value.

7. A process according to claim 5, further comprising the steps of:
   providing three time windows wherein their overall length is less than or equal to the pulse duration of the logical states;
   forming the limits of a middle time window from the permissible tolerance values of the field strength change that are symmetrical with the foreseeable time at which the field strength changes, wherein the other time windows are before and after the middle time window; and
   retaining the prior correction value when the field strength changes within the middle time window wherein when the field strength changes within the middle time window, the prior correction value is retained, and when the field strength changes in one of the other time windows, the correction value is raised or lowered.

8. A process according to claim 5 further comprising the step of:
   providing two time windows whose overall length is less than or equal to the pulse duration of the logical states wherein a field strength change is set as the limit for the foreseeable time, and the correction value is adjusted depending on the time window in which the field strength change fails.

* * * * *